United States Patent [19]

Littlefield

[11] Patent Number: 5,056,139
[45] Date of Patent: Oct. 8, 1991

[54] METHODS AND APPARATUS FOR ELECTRONICALLY LIMITING BROADCAST COMMUNICATION

[75] Inventor: David E. Littlefield, Garland, Tex.
[73] Assignee: Texas Instruments Incorporated, Dallas, Tex.
[21] Appl. No.: 527,218
[22] Filed: May 22, 1990
[51] Int. Cl.⁵ ............................................. H04N 7/167
[52] U.S. Cl. .......................................... 380/20; 380/13
[58] Field of Search ...................................... 380/20, 13

[56] References Cited

U.S. PATENT DOCUMENTS

| | | | |
|---|---|---|---|
| 4,130,833 | 12/1978 | Chomet | 380/20 |
| 4,323,922 | 4/1982 | den Toonder et al. | 380/20 |
| 4,518,993 | 5/1985 | Okada et al. | 380/13 |
| 4,530,008 | 7/1985 | McVoy | 380/13 |
| 4,837,820 | 6/1989 | Bellavia, Jr. | 380/20 |
| 4,864,613 | 9/1989 | Van Cleave | 380/13 |
| 4,947,429 | 8/1990 | Bestler et al. | 380/20 |

Primary Examiner—Thomas H. Tarcza
Assistant Examiner—David Cain
Attorney, Agent, or Firm—James L. Kesterson; James T. Comfort; Melvin Sharp

[57] ABSTRACT

A communication receiver (12) is provided having a radio frequency section (20) for receiving a communication signal (14) and a corresponding code signal (16) carrying an identification code. An intermediate frequency section (26) is coupled to radio frequency section (20) to convert the frequency of said communication signal. A decoder (42) having a memory for storing a security code, is coupled to radio frequency section (20) and intermediate frequency section (26). Decoder (20) is operable to compare the identification code and the security code and selectively disable the intermediate frequency section in response.

44 Claims, 1 Drawing Sheet

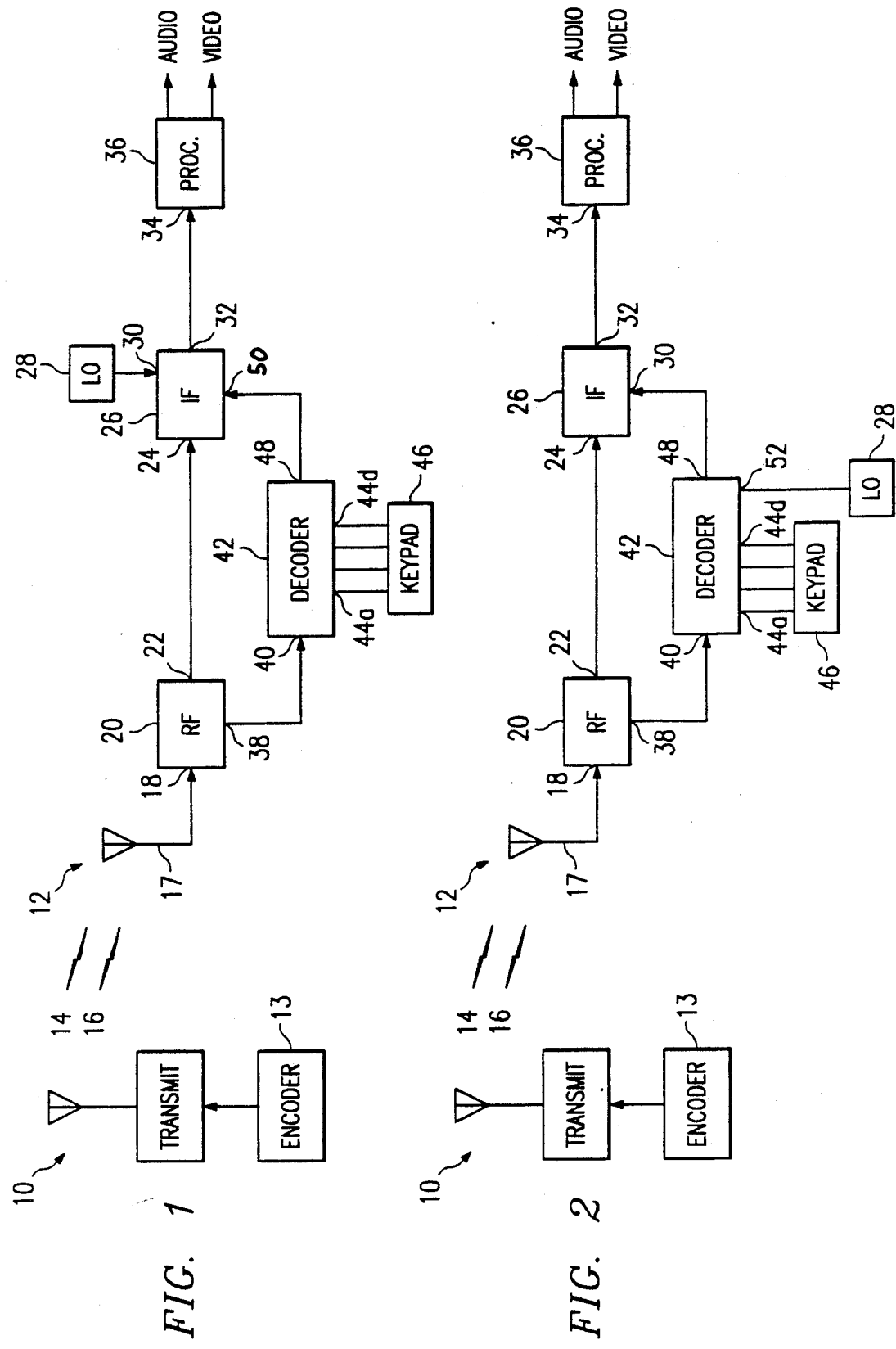

METHODS AND APPARATUS FOR ELECTRONICALLY LIMITING BROADCAST COMMUNICATION

TECHNICAL FIELD OF THE INVENTION

The present invention relates in general to broadcast communications and in particular to apparatus and methods for electronically limiting such communications.

BACKGROUND OF THE INVENTION

The expansion of the cable television industry has vastly changed the amount and quality of the television programming available to the viewing public. Many of the programs now available to a cable subscriber are not suitable for young viewers being replete with graphic violence, sex and language. At the same time, broadcast television has also become more permissive in the amount of similar programming being provided on the air waves.

Although expanded programming provides many advantages to adult viewers, it provides many disadvantages to parents of impressionable children and younger teenagers. Without supervision, parents can find their children watching objectionable programming on either broadcast television channels or on the cable, if available in the household. Parents may try one of several means of physically disabling the television set while their children are unsupervised. Such methods may include removal of the power cord or the remote controller for the television, or disconnection of the antenna leads. Clever young viewers may be able to circumvent these methods by merely reconnecting the power cord, searching and finding the missing control device or reattaching the antenna leads. Further, these methods completely deny younger viewers of television programming, including programming which may have some beneficial informational or educational content.

Subscriber television companies have tried filters in the cable transmission lines and expensive scramblers on both cable and broadcast signals. Besides the expense, such devices have proven ineffective and to a major extent uncontrollable. For example, the parents themselves may have defeated these devices for convenience or other reasons.

Other areas of the communications field also suffer from problems connected with the numerous signals being broadcast. These problems are especially acute in areas where a single transmitter or several transmitters are cluttering the air waves with multiple transmissions. For example, a police precinct may be transmitting signals which are received by a number of police cars tuned in to that frequency even though only a limited number of such police cars may be in need of the specific information being transmitted. In this system, each and every police car must nevertheless receive the communication on its receiver, and listen to it to before deciding whether the information is applicable to their situation.

A similar problem to that of the police precinct is that found around airports. Normally, all traffic is on one or two specific frequencies, such that all planes on a selected frequency must hear the broadcast instructions, which may cause major distractions in the cockpit.

Thus, a need has arisen for a means for electronically limiting the reception of transmitted communications, such as radio, broadcast television and cable television transmissions. Such a system would allow only a specified group of receivers to actually receive and process a transmitted communication. Such a system should be inexpensive and be capable of being integrated into present communications transmitters and receivers.

SUMMARY OF THE INVENTION

The present invention provides a communication receiver, including a radio frequency section, for receiving both a communication signal and an associated code signal carrying an identification code. The receiver also includes an intermediate frequency section coupled to the radio frequency section to convert the frequency of the communications signal into a frequency more easily handled by an associated signal processor. A decoder having a memory for storing a security code is coupled to the radio frequency section and the intermediate frequency section. The decoder receives the code signal from the radio frequency section and compares the identification code being carried by the code signal to the stored security code. The decoder is operable to enable or disable the intermediate frequency section when the identification code and the security code match, depending on the selected logic.

The communications receiver described in the preferred embodiment may be used in a system in which a transmitter transmits a communication signal, such as a television signal, together with an associated code signal carrying an identification code, such as a program rating code for the television program. A rating code, for example, could be adopted such that programs of certain types would carry certain agreed upon codes. This system would then allow selective reception of various communication signals, such as radio and television programming, without a great deal of effort. Parents will be able to selectively block undesirable programming from being viewed by their underaged children. Cable companies can limit their reception to only those subscribers having the security code. Expensive scramblers have been eliminated. Parents do not need to take positive physical action, such as disconnecting the power, to disable the television. Further, with this system, acceptable programming can still be received while only those programs with specified associated identification codes can be blocked.

BRIEF DESCRIPTION OF THE DRAWINGS

Other aspects of the invention and its advantages will be discerned when one refers to the following detailed description as taken in conjunction with the drawings, in which:

FIG. 1 is a functional block diagram of a first embodiment of a communications system with electronically limited reception; and FIG. 2 is a functional block diagram of a second embodiment of a communications system with electronically limited reception.

DETAILED DESCRIPTION OF THE INVENTION

A system for electronically limiting the reception of transmitted communications will be described first, followed by a description of the operation of such a system.

Referring first to FIG. 1, a transmitter is shown generally at 10, and a receiver generally at 12. Transmitter 10 and receiver 12 operate cooperatively to convey information from the operator of transmitter 10 to the user of receiver 12. In a preferred embodiment, transmitter 10 is a standard broadcast television station or the distributing point of a cable television network. Receiver 12 in the preferred embodiment is a home television set. Television transmission and reception techniques are known generally in the art, and therefore the specifics will not be described herein.

Transmitter 10 transmits the standard communications signals, associated with the selected communications format, along with a code signal. The code signal carries an identification code generated by encoder 13 corresponding to the information being conveyed by the communications signal. The identification code may be for example a digital representation encoded onto the communications signal by a modulator or mixer. In the case of television, transmitter 10 would output the standard signals associated with the television broadcast format, and a code signal carrying an identifying code for the program being broadcast. The code signal could, for example, be transmitted on a sub-carrier frequency associated with the broadcast format, or on one of the signals comprising the format carrying the synchronization pulse or the sweep pulse. Further, it should be noted that the code signal does not necessarily need to be transmitted continuously with the communications signal, but may be periodically broadcast such as in discrete increments of time. In the case of television, this would allow the identification and selective processing of programming if the television receiver was turned on after the start of the program or following a channel change. In the case of intermittent transmissions, such as in the air traffic control situation, the code signal may only need be broadcast at the start of each new communication transmission.

Communications signal 14 and code signal 16 are provided to an input 18 of radio frequency (RF) section 20 of receiver 12. In a standard airborne broadcast system, communications signal 14 and code signal 16 would be provided to input 18 via antenna 17. In a cable transmission system, communications signal 14 and code signal 16 would be provided to input 18 via a direct cable connection (not shown).

Radio frequency section 20 may be any one of a number of systems known in the art. In general, RF section 20 would contain amplifiers and filters necessary to provide receiver 12 with a sufficiently low noise figure and restricted band width such that communications signal 14 and code signal 16 can be discerned from extraneous signals and noise also appearing at input 18.

An output 22 passes an amplified communications signal 14 to an input 24 of intermediate frequency section (IF) 26. IF section 26 may be of one of a number of designs known in the art. In general, IF section 26 contains mixers and additional filters for the conversion of the frequency of communications signal 16 to a frequency at which it can be more easily processed. IF section 26 performs this frequency conversion process in conjunction with local oscillator 28 which provides a local oscillator signal to local oscillator input 30 of IF section 26. In a standard process, well known in the art, the local oscillator signal is mixed with communications signal 14 such that the frequency of communications signal 14 is either down-converted to a lower frequency or up-converted to a higher frequency.

After frequency conversion, communications signal 14 is then passed from output 32 of IF section 26 to input 34 of processor 36. Processor 36 is also well known in the art, and removes the transmitted information from communications signal 14. For example, if communications signal 14 is in the television format, processor 36 will separate and process the various components and provide the end product video and audio.

In parallel with the reception of communications signal 14, code signal 16 is passed from an output 38 of RF section 20 to input 40 of decoder 42. Decoder 42 is provided with a number of inputs 44 $a$–$d$ in which data corresponding to a security code can be input into an internal memory such as a shift register or a random access memory. In a preferred embodiment, this input is provided by a key pad 46, however, other means such as a key/lock system may be used. Decoder 42 compares an identifying code being carried on code signal 16 to the security code entered at inputs 44. If the identifications code and the security code are digital representations, this comparison may be performed by a standard integrated circuit comparator.

In the embodiment shown in FIG. 1, if the identifying code carried on code signal 16 and the security code match, decoder 42 outputs a disable signal on an output 48 which is transmitted to enable/disable input 50 of IF section 26 to disable the operation of IF section 26 and thereby halt the reception process. If on the other hand, the security code and the identifying code carried by code signal 16 do not match, no disabling signal is issued on output 48 and the reception process of communications signal 14 can proceed to completion. This function may be accomplished by activating a switch internal to IF section 26 which blocks signal 14 from continuing through the conversion process. It should be noted, that the logic of this process may be reversed such that when the identifying code and the security code match, IF section 26 is enabled and when they do not match, IF section 26 is disabled.

It should also be noted that a plurality of codes could be entered, or a range of codes so that very selective blocking/passing can occur.

In a preferred embodiment shown in FIG. 2, decoder 42 enables or disables IF section 26 by controlling the application of the local oscillator signal to IF section 26. In this embodiment, local oscillator 28 is coupled to local oscillator input 30 of IF section 26 through port 52 decoder 42. When a security code entered into the memory of decoder 42 matches the identification code carried on code signal 16, decoder 42 blocks the application of the local oscillator signal to input 30 of IF section 26, thereby preventing reception of communications signal 14. As with the embodiment discussed above, this logic may be reversed such that the local oscillator signal can be blocked when the identification code and the security code in the memory of decoder 42 do not match.

The operation of the system in a preferred embodiment where television programming is being transmitted can now be fully described. In this case, communications signal 14 carries a selected television program, while code signal 16 carries an identifying code associated with the television program. To access this program, the user must input (or have previously established) a corresponding security code into the memory of decoder 42 through keypad 46.

Decoder 42 then automatically compares the identification code carried on code signal 16, and the stored security code. Depending on the system logic, decoder 42 can then enable or disable the conversion and processing of the television signal.

The present system may be used by either the operator of receiver 12 or the operator of transmitter 10 to electronically limit program reception. For example, the operator of receiver 12 may wish to input a security code on key pad 46 which would block certain programs having specific identification codes, such as those corresponding to the Motion Picture Association of America (MPAA) ratings "R" and "X." The operator of transmitter 10, such as a cable company, may wish to limit access to certain special television programs by assigning a special associated identification code, such that only users of receiver 12 who have been specifically delivered the corresponding security code may view the television program.

Further, the present invention is not limited to television, but can be easily used in systems in which selective reception is required. For example, air traffic controllers may desire to send instructions to only selected aircraft operating in their control zone. The selected aircraft would enter a security code corresponding to the identification code broadcast with the communications transmission. Other aircraft would not enter the security code and would be spared from receiving instructions not directed to them. A similar system may be employed in the vicinity of a police precinct.

Finally, the present system may be employed in digital audio tape (DAT) and VCR systems to limit recording or access to the information provided on the cassette. In this case, transmitter 10 is a VCR or DAT unit outputting the information provided on tape. The identification code is either encoded onto an existing track or a track dedicated for the purpose. The receiver 12 represents the playback unit or television set. Parents could thus additionally prevent access of objectionable materials by their children as provided by a recoded medium.

While a preferred embodiment of the invention and its advantages have been set forth in the above detailed description, the invention is not limited thereto but only by the scope and spirit of the appended claims.

What is claimed is:

1. A communication system comprising:
   a transmitter for broadcasting communication signals, said signals having an information content which must be processed, and also containing a periodic coded information signal useful for controlling said processing;
   a receiver for receiving and processing said communication signals, said receiver comprising:
   circuitry for processing said information content of said communication signals;
   circuitry for matching said periodic coded information signal against stored information; and
   circuitry operable in response to said matching circuitry for controlling said processing.

2. The communication system of claim 1, wherein said transmitter is a television station and said receiver is a home television set.

3. The communication system of claim 1, wherein said transmitter is a VCR and said receiver is a television set.

4. A communication receiver comprising:
   circuitry for processing communication signals, said signals having information content which must be processed and also containing periodic coded information useful for controlling said processing;
   circuitry for processing said information content of said communication signals;
   circuitry for matching said periodic coded information against stored information; and
   circuitry operable in response to said matching circuit for controlling said processing.

5. The communication receiver of claim 4, wherein said matching circuitry includes circuitry for storing a range of codes.

6. The communication receiver of claim 4, wherein said matching circuitry includes circuitry for accepting codes even after said information content of said communication signals has been received.

7. The communication receiver of claim 4, wherein said matching circuitry includes circuitry for accepting codes even before said information content of said communication signals has been received.

8. The communication receiver of claim 4, wherein said circuitry for processing said information content of said communication signals includes a frequency converter.

9. The communication receiver of claim 4, wherein said circuitry for matching includes a comparator circuit.

10. A communication receiver comprising:
    a radio frequency section for receiving a communication signal and a corresponding periodic code signal carrying an identification code;
    an intermediate frequency section coupled to said radio frequency section for converting the frequency of said communication signal; and
    a decoder having a memory for storing a security code, said decoder operable to compare said identification code and said security code and selectively disable said intermediate frequency section in response to said comparison.

11. The communication receiver of claim 10, and further comprising a key pad for entering said security code into said memory.

12. The communication receiver of claim 10, wherein said decoder disables said intermediate frequency section by preventing the application of a local oscillator signal thereto.

13. The communication receiver of claim 10, wherein said decoder disables said intermediate frequency section when said security code and said identification code match.

14. The communication receiver of claim 10, wherein said decoder disables said intermediate frequency section when said security code and said identification code do not match.

15. A television receiver comprising:
    a radio frequency section for receiving a television signal and a corresponding periodic code signal carrying an identification code;
    an intermediate frequency section coupled to said radio frequency section for selectively converting the frequency of said television signal upon the application of a local oscillator signal; and
    a decoder having a memory for storing a security code, said decoder operable to compare said security code with said identification code, and in response selectively apply said local oscillator signal to said intermediate frequency section.

16. The television receiver of claim 15, and further comprising a keypad for entering said security code into said memory.

17. The television receiver of claim 15, wherein said decoder applies said local oscillator signal when said security code and said identification code match.

18. The television receiver of claim 15, wherein said decoder applies said local oscillator signal when said security code and said identification code do not match.

19. The television receiver of claim 15, wherein said radio frequency section is adapted to receive said television signal and said code signal when transmitted via standard airborne broadcast.

20. The television receiver of claim 15, wherein said radio frequency section is adapted to receive said television signal and said code signal when transmitted via a cable.

21. The television receiver of claim 15, wherein said radio frequency section is coupled to said intermediate frequency section through said decoder.

22. Apparatus for selectively receiving identified communication transmissions, comprising:
  a radio frequency section for receiving a transmitted communication signal and a periodic code signal carrying a corresponding identification code;
  an intermediate frequency section having a radio frequency input port coupled to said radio frequency section for inputting said communication and code signals, and having a local oscillator input port, said intermediate frequency operable to convert the frequency of said communication signal when a local oscillator signal is selectively applied to said local oscillator port; and
  a decoder having at least one security code input port, a code signal input port coupled to said radio frequency section for inputting said code signal and a local oscillator output port coupled to said local oscillator input port of said intermediate frequency section, said decoder operable to compare said identification code with a security code applied to said security code port and in response, selectively output said local oscillator signal to said intermediate frequency section.

23. The apparatus of claim 22, wherein said decoder outputs said local oscillator signal when said identification code does not match said security code.

24. The apparatus of claim 22, wherein said decoder outputs said local oscillator signal when said identification code and said security code match.

25. A communication system comprising:
  a transmitter for transmitting communication signals, said signals having information content which must be processed, comprising:
  an encoder for periodically encoding an identification code onto a portion of said communication signals;
  circuitry for broadcasting said communication signal; and
  a receiver comprising:
    a radio frequency section for receiving said communication signals;
    an intermediate frequency section coupled to said radio frequency section for selectively converting the frequency of said communication signals upon the application of a local oscillator signal; and
    a decoder having a memory for storing a security code, said decoder operable to compare said security code with said identification code, and in response selectively apply said local oscillator signal to said intermediate frequency section.

26. The communication system of claim 25, wherein said decoder includes a digital comparator for comparing the identification code and the security code.

27. The communication system of claim 25, and further comprising circuitry for inputting said security code into said memory of said decoder.

28. The communication system of claim 25, wherein said encoder is a frequency modulator.

29. A method for electronically limiting broadcast communication, comprising the steps of:
  transmitting communication signals, the communication signals having information content which must be processed and also containing periodic coded information useful for controlling the processing;
  receiving the communication signals;
  comparing the coded information with a security code; and
  responsive to said step of comparing, selectively processing said communication signals.

30. The method of claim 29, wherein said coded information is transmitted on a subcarrier of said communication signals.

31. The method of claim 29, wherein said coded information is digitally encoded into said communication signals.

32. The method of claim 29, wherein said digitally coded information is digitally compared with said security code.

33. A method of electronically limiting the reception of transmitted communication, comprising the steps of:
  transmitting a communication signal;
  transmitting a code signal carrying an identification code corresponding to the communication signal, said identification code independent of a communication receiver;
  receiving the communication signal and the code signal at an input of said communication receiver;
  entering a security code into a decoder;
  comparing the identification code carried by the code signal with the security code using the decoder; and
  responsive to said step of comparing, selectively converting the communication signal.

34. The method of claim 33, wherein the communication signal is converted when the identification code does not match the security code.

35. The method of claim 33, wherein the communication signal is converted when the identification code and the security code match.

36. The method of claim 33, wherein the communication signal is a television signal.

37. A method of electronically limiting the reception of television programming, comprising the steps of:
  transmitting a communication signal format carrying a selected television program;
  transmitting a code signal carrying an identification code corresponding to the television program, said identification code independent of a communication receiver;
  receiving the communication signal format a an input of an intermediate frequency processor;
  receiving the code signal at an input of a decoder;
  entering and storing a security code in the decoder;
  comparing the identification code carried by the code signal with the security code using the decoder; and
  responsive to said step of comparing, selectively passing a local oscillator signal to the intermediate frequency process or for converting the communication signal format.

38. The method of claim 37, wherein the local oscillator signal is passed to the intermediate frequency processor when the identification code and the security code do not match.

39. The method of claim 37, wherein the local oscillator signal is passed to the intermediate frequency processor when the identification code and the security code match.

40. The method of claim 37, wherein the communication signal format and the code signal are transmitted by standard airborne broadcast.

41. The method of claim 37, wherein the communication signal format and the code signal are transmitted by cable.

42. The method of claim 37, wherein the identification code represents a program rating for the television program carried by the communication signal.

43. The method of claim 37, wherein the code signal is transmitted on a sub-carrier frequency of said communication signal format.

44. The method of claim 37, wherein the code signal is transmitted periodically with the communication signal.

* * * * *